US011280560B1

(12) United States Patent
Lin et al.

(10) Patent No.: US 11,280,560 B1
(45) Date of Patent: Mar. 22, 2022

(54) HEAT EXCHANGER WITH TWO-PIECE THROUGH FITTINGS

(71) Applicant: DANA CANADA CORPORATION, Oakville (CA)

(72) Inventors: Shuding Lin, Mississauga (CA); Jun Wang, Oakville (CA)

(73) Assignee: Dana Canada Corporation, Oakville (CA)

( * ) Notice: Subject to any disclaimer, the term of this patent is extended or adjusted under 35 U.S.C. 154(b) by 1 day.

(21) Appl. No.: 17/115,193

(22) Filed: Dec. 8, 2020

(51) Int. Cl.
| | |
|---|---|
| *F28F 3/08* | (2006.01) |
| *F28F 3/04* | (2006.01) |
| *F28F 3/12* | (2006.01) |
| *H01M 10/625* | (2014.01) |

(52) U.S. Cl.
CPC ............... *F28F 3/046* (2013.01); *F28F 3/12* (2013.01); *H01M 10/625* (2015.04)

(58) Field of Classification Search
CPC .......... F28F 3/12; F28F 2210/10; F28F 3/046; H01M 10/625; H01M 10/613; H01M 6/5038; B60H 1/00278
USPC ........................................................ 165/166
See application file for complete search history.

(56) References Cited

U.S. PATENT DOCUMENTS

| | | | | |
|---|---|---|---|---|
| 9,666,912 | B2* | 5/2017 | Obrist ................. | H01M 10/613 |
| 9,893,392 | B2* | 2/2018 | Vanderwees ...... | H01M 10/6555 |
| 9,958,210 | B2* | 5/2018 | Seewald ............... | F28D 1/0435 |
| 10,006,722 | B2* | 6/2018 | Kenney ............... | H01M 10/613 |
| 10,024,602 | B2* | 7/2018 | Nyander ................ | F28F 3/046 |
| 10,935,330 | B2* | 3/2021 | Subramanyam ........ | F25B 39/00 |
| 2002/0195237 | A1* | 12/2002 | Luz ..................... | H01M 10/625 |
| | | | | 165/153 |
| 2003/0121649 | A1* | 7/2003 | Seiler .................... | F28F 9/0246 |
| | | | | 165/167 |
| 2003/0131979 | A1* | 7/2003 | Kim ...................... | F28F 9/0246 |
| | | | | 165/164 |
| 2007/0044946 | A1* | 3/2007 | Mehendale ............. | F28F 3/044 |
| | | | | 165/153 |
| 2007/0089872 | A1* | 4/2007 | Hou ....................... | F28F 9/026 |
| | | | | 165/167 |

(Continued)

OTHER PUBLICATIONS

Graves, pending U.S. Appl. No. 16/688,390, filed Nov. 19, 2019, entitled "Heat Exchanger With Crossover Passages for Cold Fluid Distribution", 40 pages.

*Primary Examiner* — Claire E Rojohn, III
(74) *Attorney, Agent, or Firm* — Ridout & Maybee LLP

(57) ABSTRACT

A heat exchanger includes first and second plates between which a fluid flow passage is defined, through-holes defining inlet and outlet ports, and through fittings having first and second segments. Each segment includes a tube portion extending through one of the holes and a flange portion located inside the fluid flow passage. The flange portion of each segment has opposed first and second surfaces, the first surface joined to the inner surface of one of the plates in a fluid-tight manner. The second surfaces of both segments face each other, and at least second surface has one or more channels providing fluid flow from the hollow interior to the fluid flow passage. The second surfaces of the segments are in contact or closely apart from one another, the flange portions of the first and second segments providing support for the first and second plates in the area surrounding the ports.

20 Claims, 9 Drawing Sheets

(56) References Cited

U.S. PATENT DOCUMENTS

| | | | |
|---|---|---|---|
| 2011/0011568 A1* | 1/2011 | Han | F28D 9/0043 |
| | | | 165/133 |
| 2011/0290461 A1* | 12/2011 | Andersson | F28D 9/005 |
| | | | 165/170 |
| 2011/0290462 A1* | 12/2011 | Andersson | F28D 9/005 |
| | | | 165/170 |
| 2011/0308779 A1* | 12/2011 | Andersson | F28D 9/005 |
| | | | 165/170 |
| 2012/0031598 A1* | 2/2012 | Han | F28D 1/0333 |
| | | | 165/170 |
| 2018/0123194 A1 | 5/2018 | Vanderwees | |
| 2021/0278138 A1* | 9/2021 | Yoo | F28D 9/005 |

* cited by examiner

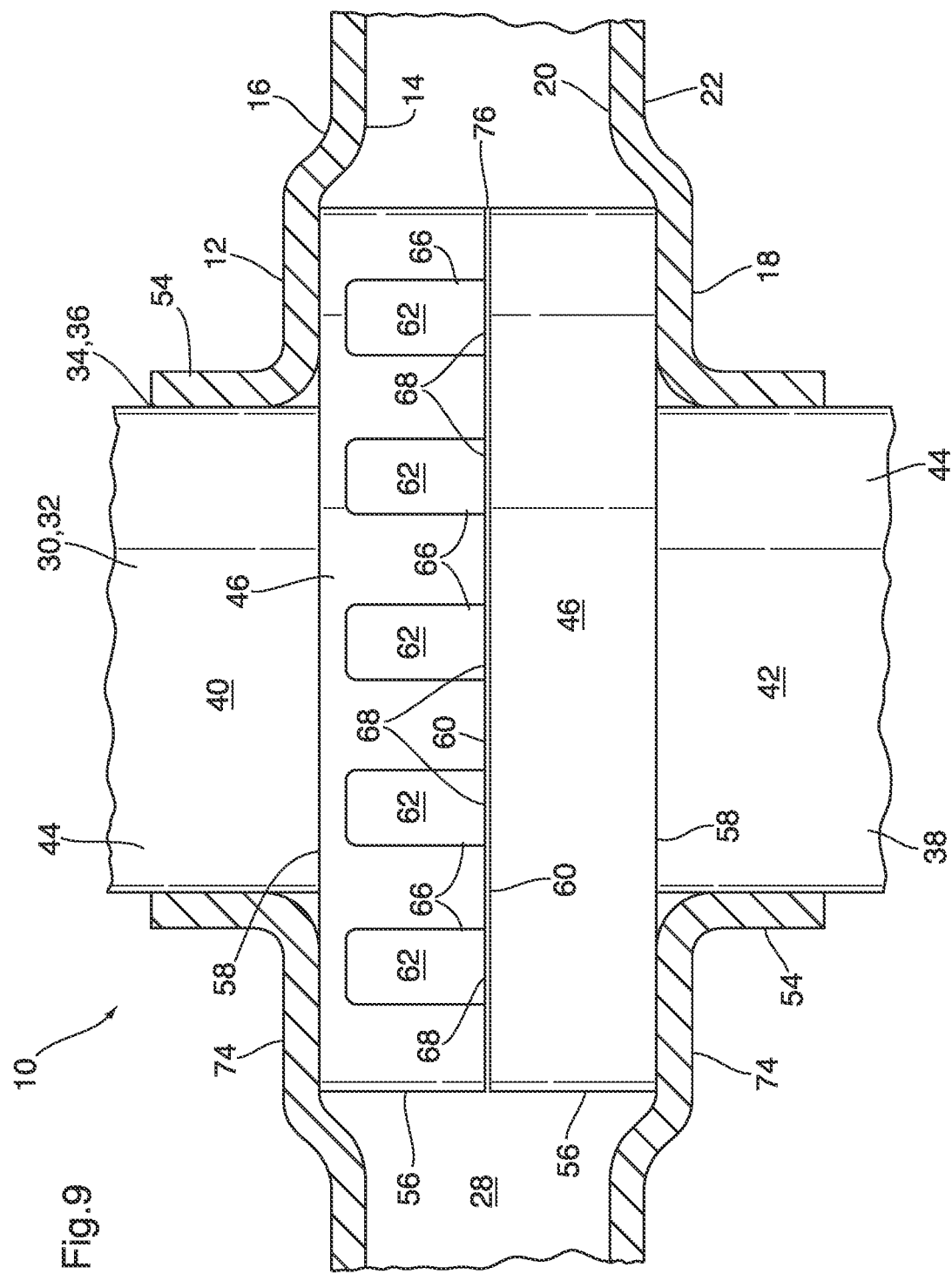

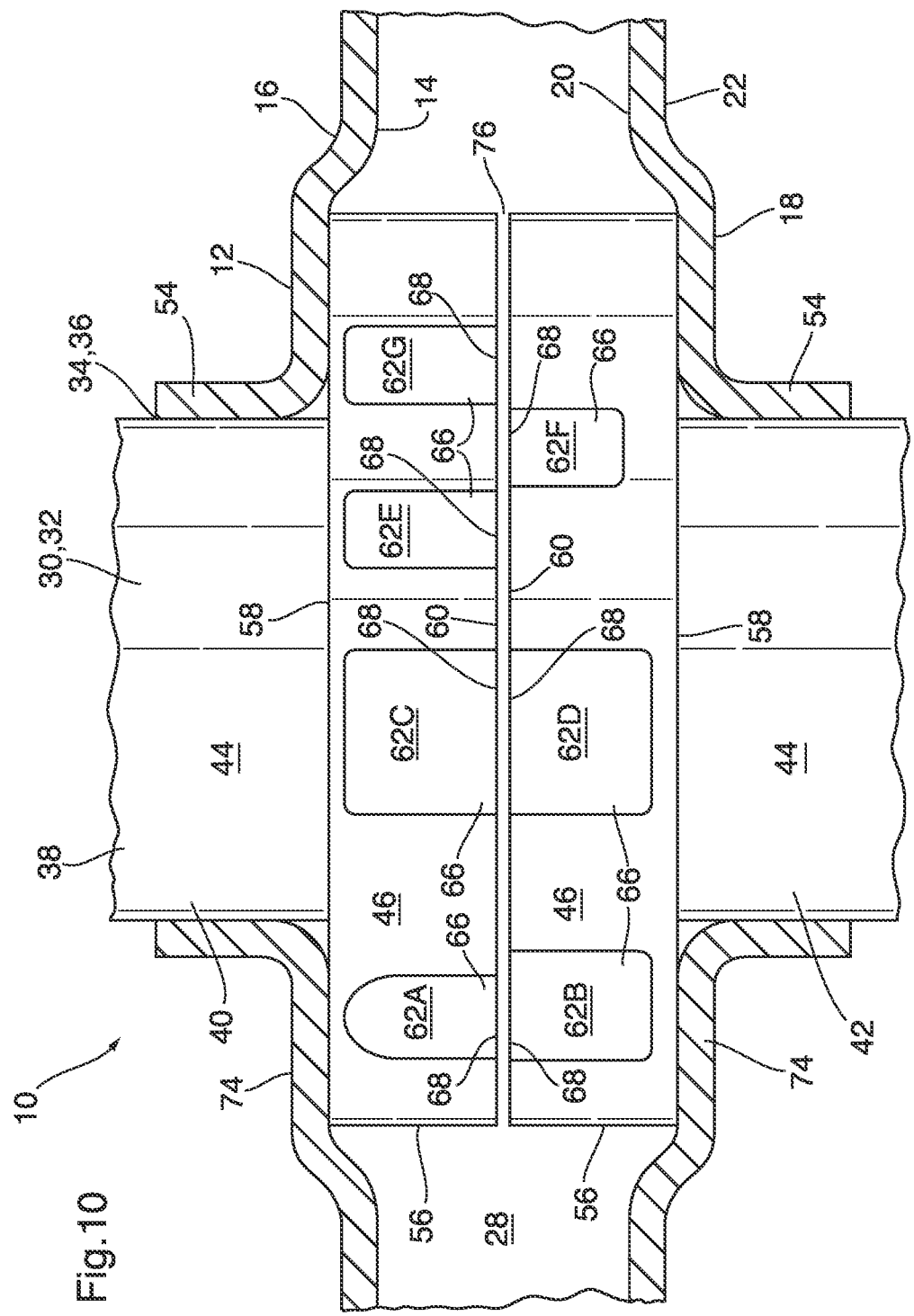

HEAT EXCHANGER WITH TWO-PIECE THROUGH FITTINGS

TECHNICAL FIELD

The present disclosure relates to heat exchanger construction, and particularly to a heat exchanger having through-holes to permit passage of heat transfer fluid through the heat exchanger, and to thermal management systems incorporating such heat exchangers.

BACKGROUND

Thermal management systems for vehicles may include two or more heat exchangers connected in parallel to common inlet and outlet manifolds. In some configurations, the individual heat exchangers of the system may include a pair of through-holes which function as inlet and outlet ports, and as parts of the inlet and outlet manifolds to distribute the heat transfer fluid to other heat exchangers in the system. An example of such a heat exchanger structure is illustrated in FIG. 1 of commonly assigned U.S. Pat. No. 10,006,722, which is incorporated herein by reference in its entirety.

The heat exchangers shown in FIG. 1 of U.S. Pat. No. 10,006,722 are provided with face seals surrounding the through openings on both sides of the heat exchanger, to enable the formation of sealed fluid connections with inlet and outlet manifolds provided in a frame structure. Some configurations use tubular fittings instead of face seals to form the fluid connections. These fittings may project at right angles from both sides of the heat exchanger, and are sealingly secured to the external surfaces of the heat exchanger. Where both the inlet and outlet ports of the heat exchanger comprise through-holes, a total of four fittings are required, two at the inlet port and two at the outlet port.

In some heat exchanger constructions, the area of the fluid flow passage in the vicinity of each through-hole lacks internal support, and additional support elements may be required inside the fluid flow passage to prevent deformation of the plates in the vicinity of the through-hole. Such support elements are also disclosed in above-mentioned U.S. Pat. No. 10,006,722. In addition, where the fittings are brazed to the outer, unclad, surfaces of plates comprising the heat exchanger, rings of brazing filler metal may be required between the sealing surfaces of the fitting and the heat exchanger plate, thereby increasing the number of components required for assembly.

There is a need for an improved fitting construction of heat exchangers which include through-holes.

SUMMARY

In accordance with an aspect of the present disclosure, there is provided a heat exchanger comprising: (a) a first plate having an inner surface, an outer surface and at least one first hole; (b) a second plate having an inner surface, an outer surface and at least one second hole, wherein each of the at least one first holes is in opposed, spaced relation to one of the second holes; (c) a fluid flow passage defined between the inner surfaces of the first and second plates; and (d) at least one through fitting, wherein each through fitting comprises a first segment and a second segment, each segment having a first open end located outside the fluid flow passage, a second open end inside the fluid flow passage, and a hollow interior.

According to an aspect, each segment comprises a tube portion and a flange portion. The flange portion is located inside the fluid flow passage, and the tube portion of each segment extends through one of the first or second holes to the first open end of the segment. The flange portion of each segment extends radially outwardly of the tube portion and is joined thereto. The flange portion has opposite first and second surfaces, wherein the first surface is continuous and is sealingly joined to the inner surface of one of the first and second plates so as to provide a continuous seal between the segment and the first or second plate in an area surrounding the first or second hole.

According to an aspect, the second surface of the flange portion of the first segment is in opposed facing relation to the second surface of the flange portion of the second segment. The second surface of one or both of the first and second segments comprises one or more channels, each channel having an open first end and an opposite open second end, wherein the open first end is in flow communication with the hollow interior of the through fitting, and the open second end is in fluid communication with the fluid flow passage.

According to an aspect, the fluid flow passage extends between an inlet port and an outlet port; and each of the inlet port and the outlet port is in the form of a through opening comprising an opposed pair of the first and second holes.

According to an aspect, the first and second segments of each through fitting are in concentric arrangement with one another.

According to an aspect, the flange portion of each segment is annular and has a thickness of about one half of a height of the fluid flow passage in an area surrounding the first and second holes.

According to an aspect, the flange portion has an outer peripheral edge which is spaced from an edge of the fluid flow passage.

According to an aspect, each of the one or more channels extends part way through a thickness of the flange portion, and has an open face which is co-planar with the second surface.

According to an aspect, the one or more channels comprises a plurality of channels, which are spaced apart from one another along the second surface.

According to an aspect, the second surface of each of the first and second segments is provided with the one or more channels.

According to an aspect, each of the channels in the second surface of the first segment is aligned with one of the channels in the second surface of the second segment, so as to provide one or more combined flow channels.

According to an aspect, the second surfaces of the two segments are mirror images, such that each of the channels in the second surface of the first segment is aligned with a corresponding one of the channels in the second surface of the second segment.

According to an aspect, the holes are proximate to an outer edge of the fluid flow passage, such that the fluid flow passage includes a narrow edge channel between each of the through fittings, wherein the narrow edge channel is open at its ends. The open second end of at least one of the channels may face toward the outer edge of the fluid flow passage and is in flow communication with the narrow edge channel.

According to an aspect, the flange portions of the first and second segments have a combined height such that they extend throughout substantially an entire height of the fluid flow passage, to provide internal support for the fluid flow passage in areas surrounding the first and second holes, while providing flow communication between the hollow interior of each fitting and the fluid flow passage.

According to an aspect, the flange portions of the first and second segments have a combined height which is slightly less than a height of the fluid flow passage; and a narrow spacing is provided between the second surfaces of the flange portions of the first and second segments.

According to an aspect, a major amount of fluid flow between the hollow interior of each through fitting and the fluid flow passage is through the channels, and a minor amount of fluid flow is through the spacing between the second surfaces of the flange portions.

According to an aspect, the spacing between the second surfaces of the flange portions is less than about 5% of a height of the fluid flow passage.

According to an aspect, the first and second plates are comprised of an aluminum alloy, wherein the inner surfaces of the plates are provided with a clad layer of a brazing alloy. The first surfaces of the flange portions are sealingly joined to the inner surfaces of the first and second plates, with the clad layer forming a braze joint between the first surfaces of the flanges and the inner surfaces of the first and second plates.

According to an aspect, each of the holes is surrounded by an upstanding collar which engages the outer surface of one of the tube portions.

According to an aspect, the flange portion of each segment has an annular disc-like shape with an outer peripheral edge which is circular and concentric with the tube portion.

According to an aspect, each of the channels is straight and radially directed between its first and second open ends.

In accordance with another aspect of the present disclosure, there is provided a thermal management system comprising a plurality of heat exchangers as described herein. The heat exchangers of the system are fluidly connected in parallel flow arrangement, and the heat exchangers are spaced apart from one another to receive a component to be cooled and/or heated between outer surfaces of adjacent pairs of the heat exchangers.

BRIEF DESCRIPTION OF THE DRAWINGS

Exemplary embodiments of the present disclosure will now be described, by way of example, with reference to the accompanying drawings, in which:

FIG. 9 shows a portion of a heat exchanger incorporating a through fitting according to another embodiment; and FIG. 10 shows a portion of a heat exchanger incorporating a through fitting according to another embodiment.

DETAILED DESCRIPTION

Figure 1:
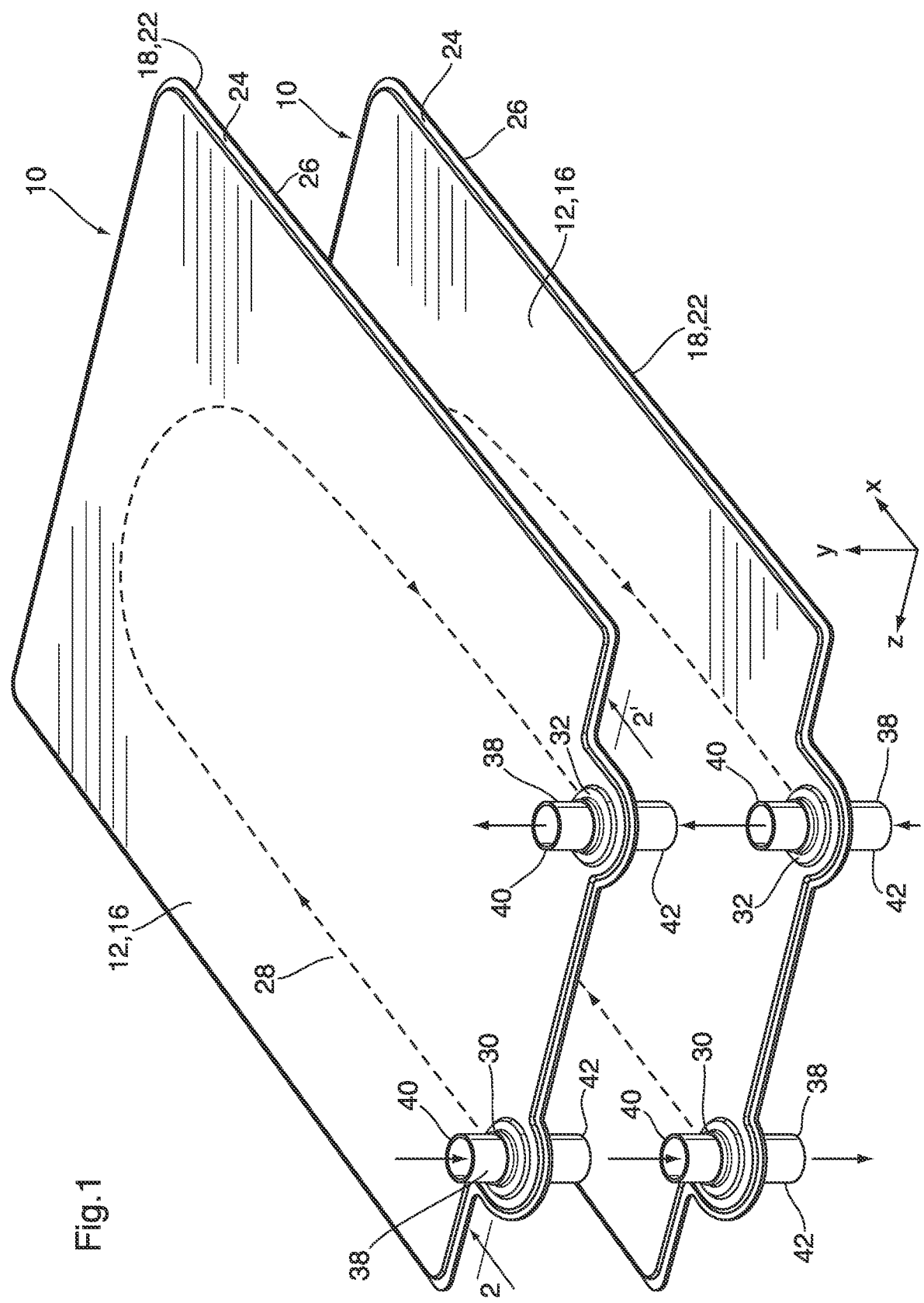
FIG. 1 is a perspective view of a plurality of heat exchangers in parallel flow arrangement.
Figure 2:
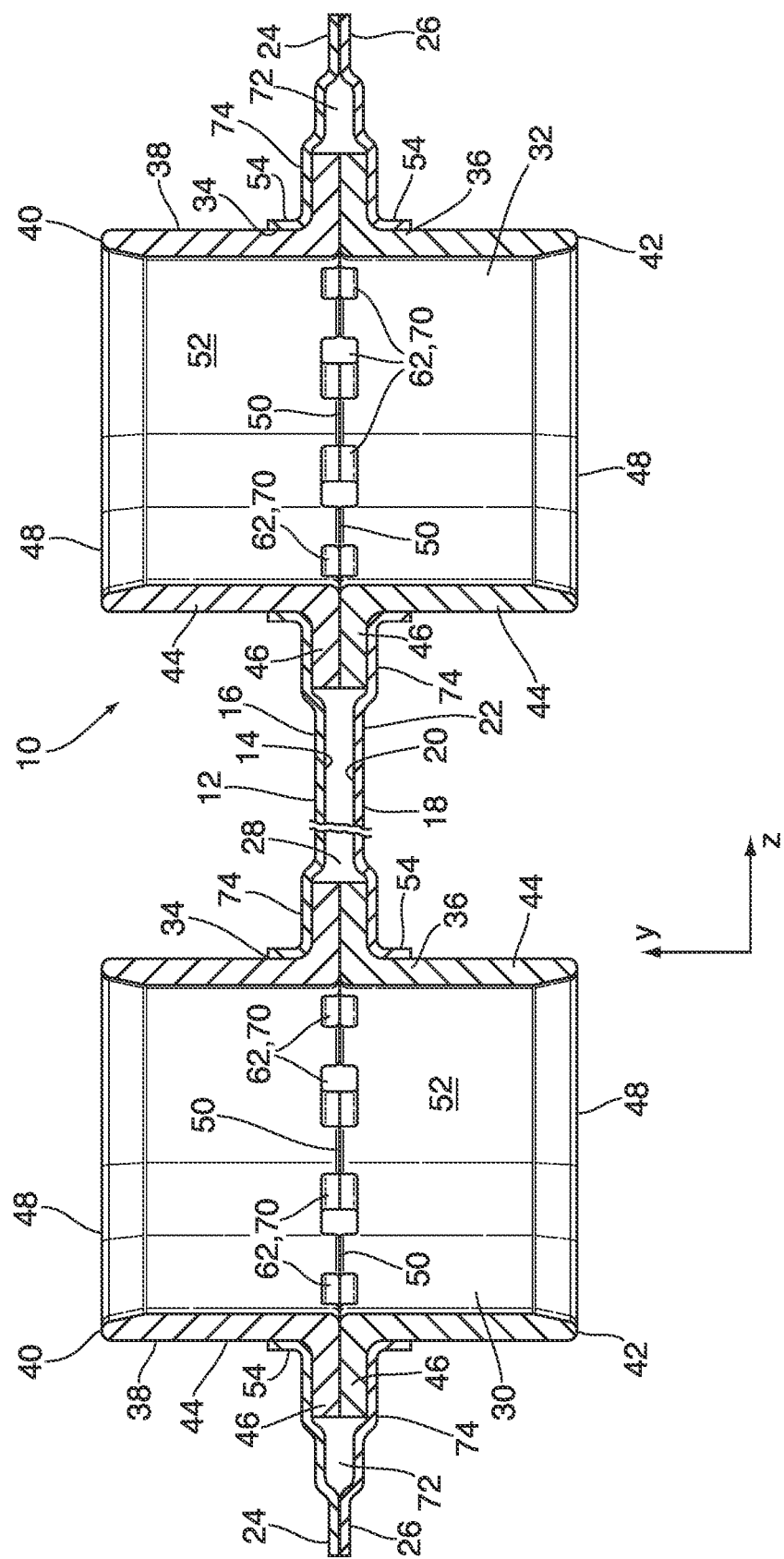
FIG. 2 is a cross section along line 2-2' of FIG. 1.
Figure 3:
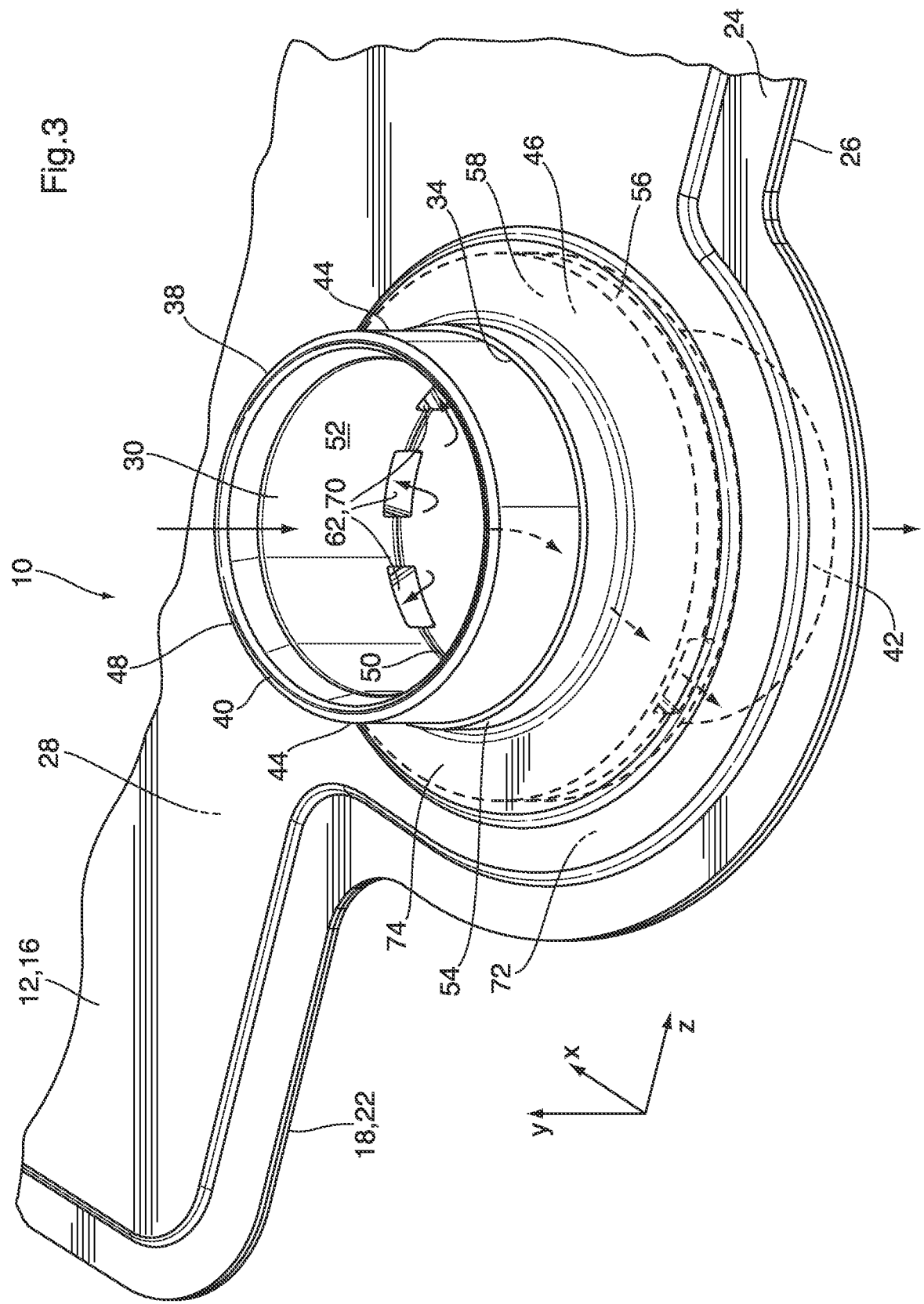
FIG. 3 is an enlarged close-up of a portion of FIG. 1.
Figure 4:
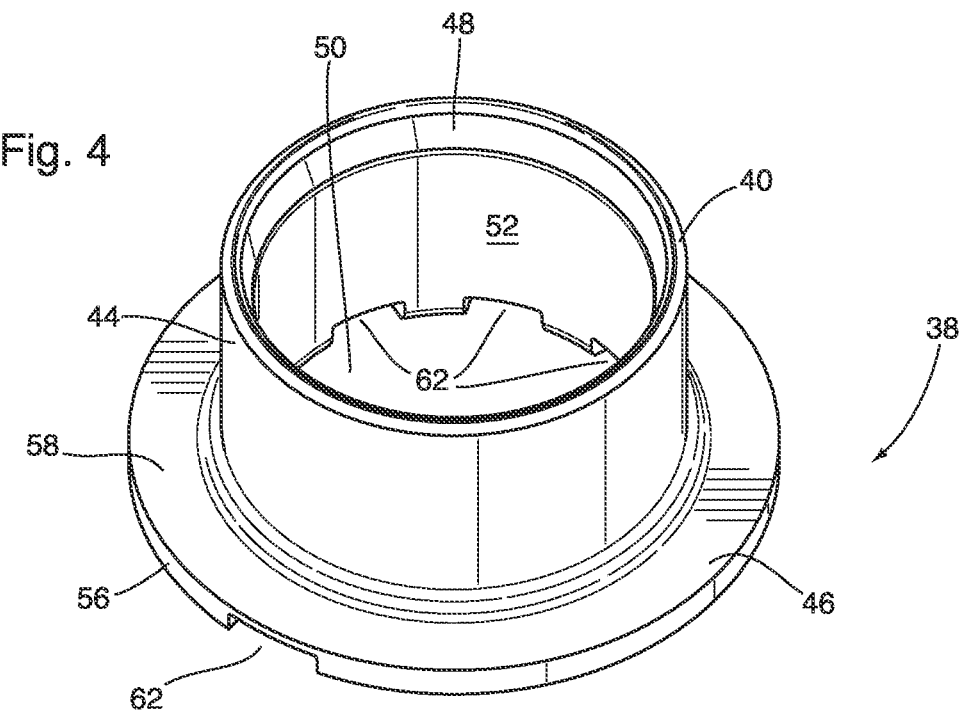
FIG. 4 is a perspective view of a two-piece through fitting, with the two segments of the fitting separated.
Figure 4:
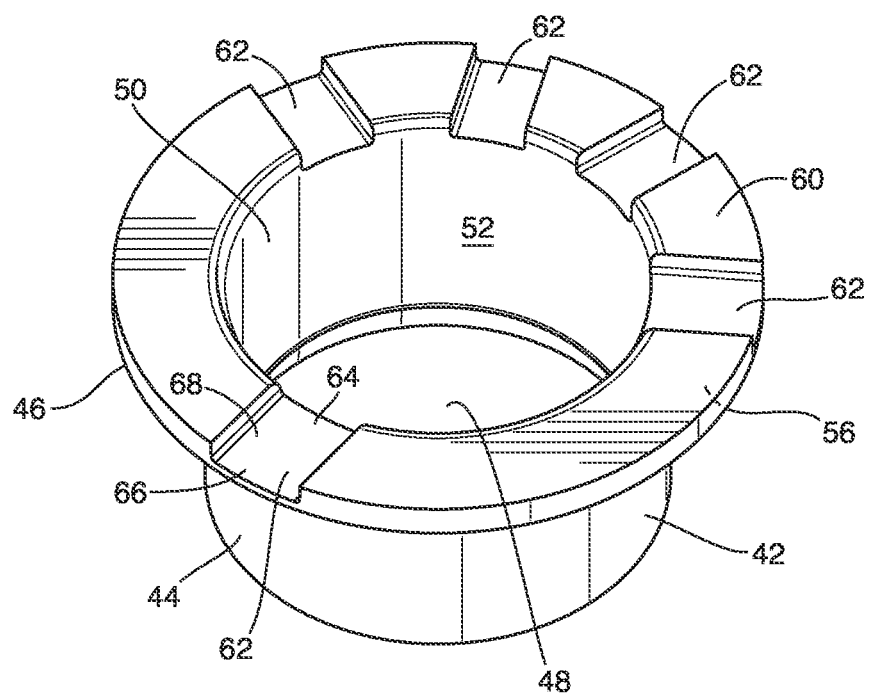
Figure 5:
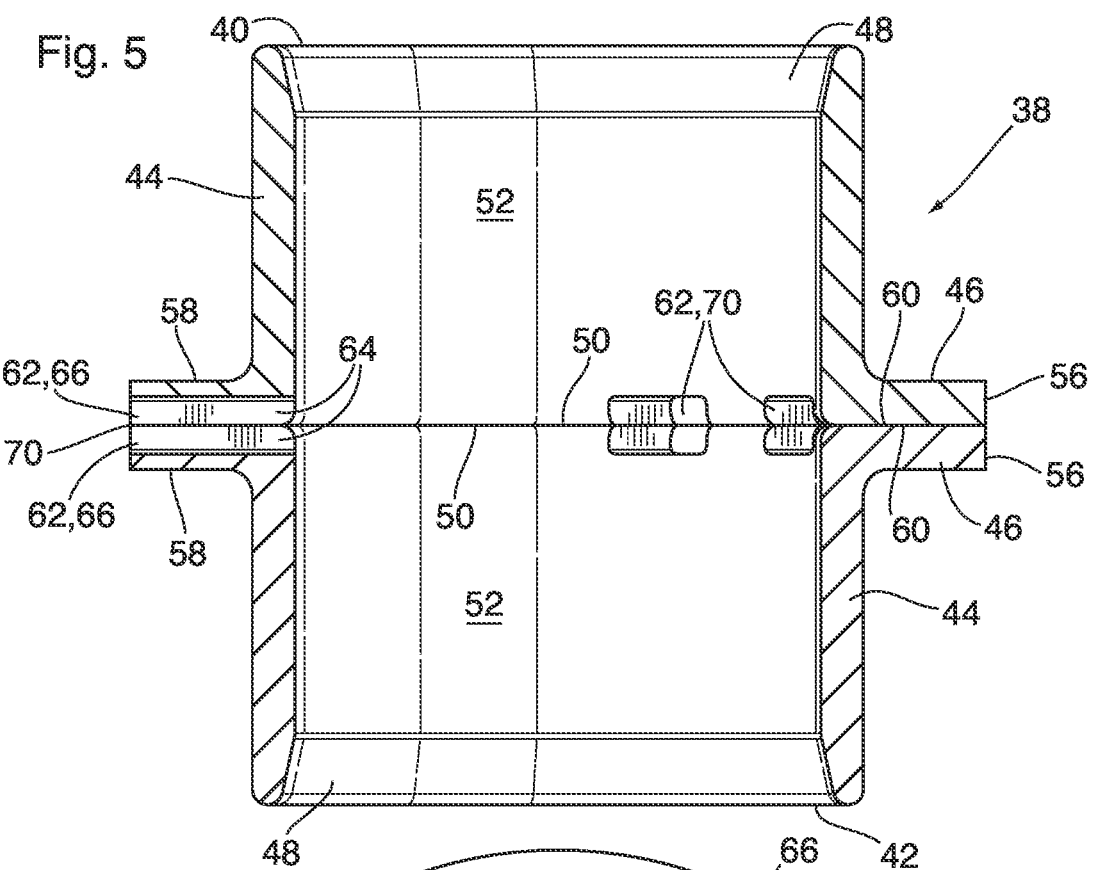
FIG. 5 is a vertical cross-section through the two-piece through fitting of FIG. 4.

FIG. 1 illustrates a plurality of heat exchangers 10 which are arranged for parallel flow arrangement, and FIGS. 2 and 3 are close-up views of portions of one heat exchanger 10.

As used herein, the term "parallel flow arrangement" means that the heat exchangers 10 are joined or adapted to be joined to common inlet and outlet manifolds which distribute the heat transfer fluid to the plurality of heat exchangers 10.

Each heat exchanger 10 comprises a first plate 12 having inner and outer surfaces 14, 16, and a second plate 18 having inner and outer surfaces 20, 22. The first and second plates 12, 18 may include peripheral flanges 24, 26 along which the first and second plates 12, 18 are sealingly joined together, for example by brazing. The first and second plates 12, 18 may be comprised of an aluminum alloy, and the inner surfaces 14, 20 of the plates 12, 18 may be provided with a clad layer of a brazing alloy (not shown) which, when heated to a sufficiently high temperature, melts to form a braze filler metal which forms a braze joint between the peripheral flanges 24, 26.

Portions of the first and second plates 12, 18 located inwardly of the peripheral flanges 24, 26 are spaced apart from one another, with a fluid flow passage 28 being defined between the inner surfaces 14, 20 of the first and second plates 12, 18.

The fluid flow passage 28 extends between an inlet port 30 and an outlet port 32. In the present embodiment, the inlet and outlet ports 30, 32 are located along the same end of the heat exchanger 10, and the fluid flow passage 28 is schematically shown as being generally U-shaped. It will be appreciated, however, that the relative locations of the inlet and outlet ports 30, 32 and the configuration of the fluid flow passage 28 are exemplary only, and are not material to the present disclosure. In heat exchangers according to alternate embodiments, the inlet and outlet ports 30, 32 may be located at opposite ends of the heat exchanger 10, or one or both ports 30, 32 may be located between the ends of the heat exchanger 10. The fluid flow passage 28 may include one or more elements to guide the flow of heat transfer fluid between the inlet and outlet ports 30, 32, such as embossments in the first and/or second plates 12, 18, a separate embossed middle plate between the first and second plates 12, 18, and/or corrugated fins or turbulizers between the first and second plates 12, 18.

Each of the inlet port 30 and the outlet port 32 are in the form of through-openings, that is, the inlet and outlet ports 30, 32 both extend through the heat exchanger 10 and are in fluid communication with the fluid flow passage 28. Each of these through-openings 30 or 32 comprises a first hole 34 formed in the first plate 12 and a second hole 36 formed in the second plate 18, the first hole 34 and the second hole 36 being in opposed, spaced relation to each other. In the present embodiment, the first and second holes 34, 36 are circular holes of substantially the same diameter and are substantially concentric, within applicable tolerances.

Providing inlet and outlet ports 30, 32 in the form of through-openings facilitates the connection of a plurality of heat exchangers 10 in parallel flow arrangement, as shown in FIG. 1, with the inlet ports 30 of adjacent heat exchangers 10 being in alignment with one another and the outlet ports 32 of adjacent heat exchangers 10 being in alignment with one another. For example, as shown in FIG. 1, the direction of fluid flow through the aligned inlet and outlet ports 30, 32 is parallel to the y-axis, while the plates 12, 18 and the fluid flow passage may be aligned along the x-axis, the x and y axes being at right angles to each other. The heat exchangers 10 of FIG. 1 are parallel to each other (along x-axis) and are spaced apart from one another to permit a component to be cooled and/or heated to be inserted between the outer surfaces of adjacent heat exchangers 10, and in thermal contact therewith. For example, the component to be cooled and/or heated may comprise a battery cell of a rechargeable vehicle battery (not shown). A battery thermal management system for cooling and optionally heating rechargeable vehicle batteries may include a large number of such heat exchangers 10 fluidly connected in parallel flow arrangement, with at least one battery cell being received between adjacent heat exchangers 10, and with the flat side of at least one battery cell being in thermal contact with each outer surface of each heat exchanger 10, for example as described in commonly assigned U.S. patent application Ser. No. 16/688,390 filed on Nov. 19, 2019 and in above-mentioned U.S. Pat. No. 10,006,722. Rigid or flexible tubular fluid connections (not shown) may be formed between the inlet ports 30 of adjacent heat exchangers 10 and between the outlet ports 32 of adjacent heat exchangers 10. The thermal management system may include separate inlet and outlet manifolds (not shown) to which the fittings are connected by the fluid connections. Alternatively, the fluid connections may directly connect the fittings of adjacent heat exchangers together, in which case the inlet and outlet manifolds may be comprised entirely of the through fittings and the tubular fluid connections which connect them together.

Each of the inlet ports 30 and outlet ports 32 of heat exchangers 10 is provided with a two-piece through fitting 38 comprising first and second segments 40, 42. As shown in the present embodiment, the first and second segments 40, 42 may be identical to one another, and the elements of the two segments 40, 42 are assigned identical reference numerals in the following description.

Each of the segments 40, 42 comprises a tube portion 44 and a flange portion 46, which may be integrally formed or sealingly joined together, the segments 40, 42 each having first and second open ends 48, 50 and a hollow interior 52, the first open end 48 being located outside the fluid flow passage 28 and the second open end 50 being located inside the fluid flow passage 28.

The tube portion 44 extends along the y-axis from the first open end 48 toward the flange portion 46 and the second open end 50. Each tube portion 44 extends through either the first hole 34 or second hole 36 of one of the plates 12, 18, and is closely received therein. In the present embodiment, each hole 34, 36 is surrounded by a relatively short, upstanding collar 54 which engages the outer surface of tube portion 44 (FIG. 2), and may optionally be sealed thereto. The collar 54 may be formed by a swaging operation, and contributes to holding and aligning the segments 40, 42 within the holes 34, 36. However, the collars 54 are not essential. Although each collar 54 may be sealed to the outer surface of a tube portion 44, it will be appreciated that any sealing provided by collars 54 is not essential to achieving a fluid-tight seal between the fitting 38 and plates 12, 18, as will be discussed further below.

In the present embodiment, the holes 34, 36 and optional collars 54 are circular and the tube portions 44 of fittings 38 are cylindrical tubular elements having a circular cross-section, although other shapes may be used. At the first open end 48 of fitting 38, the tube portion 44 may include connecting elements (not shown) for connecting the tube portion 44 to a flexible or rigid tubular conduit, or to a tube portion 44 of an adjacent heat exchanger 10. Such connecting elements may include sockets, threads, hose barbs, quick-connectors, etc.

The flange portion 46 of each fitting 38 extends radially outwardly (along the x-axis) of the tube portion 44 and is joined thereto, with an outer peripheral edge 56 located radially outwardly of the outer surface of the tube portions 44. In the present embodiment the flange portion 46 has an annular disc-like shape with the outer peripheral edge 56 being circular, and concentric with the tube portion 44.

The flange portion 46 has oppositely arranged first and second surfaces 58, 60, both of which extend radially outwardly of the tube portion 44 to the peripheral edge 56. The surfaces 58, 60 are shown as being annular, flat and parallel. In the assembled heat exchanger 10, the first surface 58 is in contact with and sealingly joined to the inner surface 14 of first plate 12, or the inner surface 20 of second plate 18, with a fluid-tight seal. The first surface 58 of flange portion 46 may be metallurgically bonded to the inner surface 14, 20 of first or second plate 12, 18 for example by brazing. Where a brazed connection is provided, the fittings 38 may be comprised of a brazeable aluminum alloy, and the first and second plates 12, 18 may each be formed from an aluminum brazing sheet as described above, with the inner surface 14 or 20 including a clad layer of braze filler metal. Alternatively, an annular brazing ring or shim comprised of braze filler metal may be provided between the first surface 58 and inner surface 14, 20 of first or second plate 12, 18. It will be appreciated that first surface 58 of flange portion 46 provides continuous, uninterrupted sealing between the fitting 38 and plates 12, 18. The width of the first surface 58 is sufficient to reliably provide a fluid-tight seal. The seal between first surface 58 of each flange portion 46 and the inner surface 14, 20 of first or second plate 12, 18 provides fluid-tight sealing between fitting 38 and plate 12, regardless of any additional sealing which may be provided between collars 54 and tube portion 44.

The spacing between the first and second surfaces 58, 60 (along y-axis) defines the thickness of the flange portion 46, which is about one half the height of the fluid flow passage 28.

The second surface 60 of the flange portion 46 of one segment 40 is in opposed facing relation to the second surface 60 of the flange portion 46 of another segment 42. The second surface 60 of the flange portion 46 of one or both of the segments 40, 42 is interrupted by one or more channels 62. Each channel 62 has an open first end 64 and an opposite open second end 66. The open first end 64 is located at the inner surface of the flange portion 46 and/or tube portion 44, and in fluid communication with the hollow interior 52 of fitting 38. The open second end 66 is located at the outer peripheral edge 56 of the flange portion 46 and is in fluid communication with the fluid flow passage 28. Each channel 62 extends part way through the thickness of the flange portion 46, having an open face 68 which is co-planar with the second surface 60, but each channel 62 is otherwise enclosed by the material of flange portion 46 between its open first and second ends 64, 66. In other words, the channels 62 are not open along the first surface 58 of flange portion 46, which provides a continuous sealing surface.

The combined thickness of the flange portions 46 of the two segments 40, 42 is such that the flange portions 46 provide support for the plates 12, 18 in the areas surrounding ports 30, 32 without negatively affecting the sealing of the peripheral flanges 24, 26 to each other, particularly in the areas adjacent to ports 30, 32. Where the combined thickness of the flange portions 46 is too great (i.e. relative to the height of fluid flow passage 28 in area immediately surrounding ports 30, 32), this will not generally affect the sealing of the flange portions 46 to the inner surfaces 14, 20 of plates 12, 18. However, excessive thickness of the flange portions 46, for example where the combined thickness of flanges 46 is greater than the height of fluid flow passage 28, may result in insufficient contact between the peripheral flanges 24, 26. This may negatively affect the ability to form a fluid-tight seal between the peripheral flanges 24, 26 during assembly of heat exchanger 10.

On the other hand, where the combined thickness of the flange portions 46 is too small relative to the height of the fluid flow passage 28, the sealing together of the peripheral flanges 24, 26 may not be negatively affected, however insufficient thickness of flange portions 46 may negatively affect the sealing of flange portions 46 to inner surfaces 14, 20 of plates 12, 18, and/or may negatively affect the support provided to the plate walls 12, 18 by flange portions 46.

Due to manufacturing tolerances, it may be difficult to precisely match the combined thickness of the flange portions 46 to the height of the fluid flow passage 28. Therefore, the combined thickness of flange portions 46 may be such that the first surfaces 58 of flange portions 46 are sealed to the inner surfaces 14, 20 of the plates 12, 18, while the second surfaces 60 of flange portions 46 are slightly spaced apart from one another, this spacing being identified by number 76 in FIGS. 9 and 10. This spacing 76 between second surfaces 60 will ensure sufficient contact and sealing between the peripheral flanges 24, 26.

The spacing 76 between second surfaces 60 is designed to be sufficiently small that minor deflection of the plates 12, 18 toward each other, such as when heat exchangers 10 are connected together, may bring the second surfaces 60 into direct engagement with one another, preventing further deflection and collapse of the fluid flow passage 28.

In practice, the heat exchanger 10 may be designed with a spacing 76 on the order of about 0.1 mm between the second surfaces 60 of flange portions 46, while the first surfaces 58 of flange portions 46 are in sealed engagement with the inner surfaces 14, 20 of plates 12, 18. A spacing of this magnitude represents less than about 5% of the typical height of fluid flow passage 28, less than about 10% of the typical thickness of flange portion 46, and/or no more than 10-20% of the heights of flow channels 62. This spacing 76 may permit a small amount of fluid flow between second surfaces 60 (outside of flow channels 62), which may lower the pressure drop of the fluid flow from the interior 52 of each segment 40, 42 to the fluid flow passage 28. However, the fluid flow through spacing 76 is typically substantially less than the fluid flow through the flow channels 62.

The channels 62 may have various configurations, being straight, bent or curved, and having various cross-sectional shapes, such as square, rectangular, arcuate, triangular, etc. The channels 62 may be of constant or variable cross-sectional area throughout their lengths. In the present embodiment, each channel 62 is straight, extending substantially radially between its open first and second ends 64, 66. Each channel 62 is shown as having a constant, rectangular cross-sectional shape. The channels 62 may be formed by molding, forging, casting or machining.

One or more channels 62 are provided in the second surface 60 of at least one of the segments 40, 42. In the present embodiment, each segment 40, 42 includes a plurality of channels 62. Where a plurality of channels 62 are provided, they may each independently have any of the configurations described above. The channels 62 may be regularly or irregularly spaced apart from one another along the second surface 60.

Figure 6:
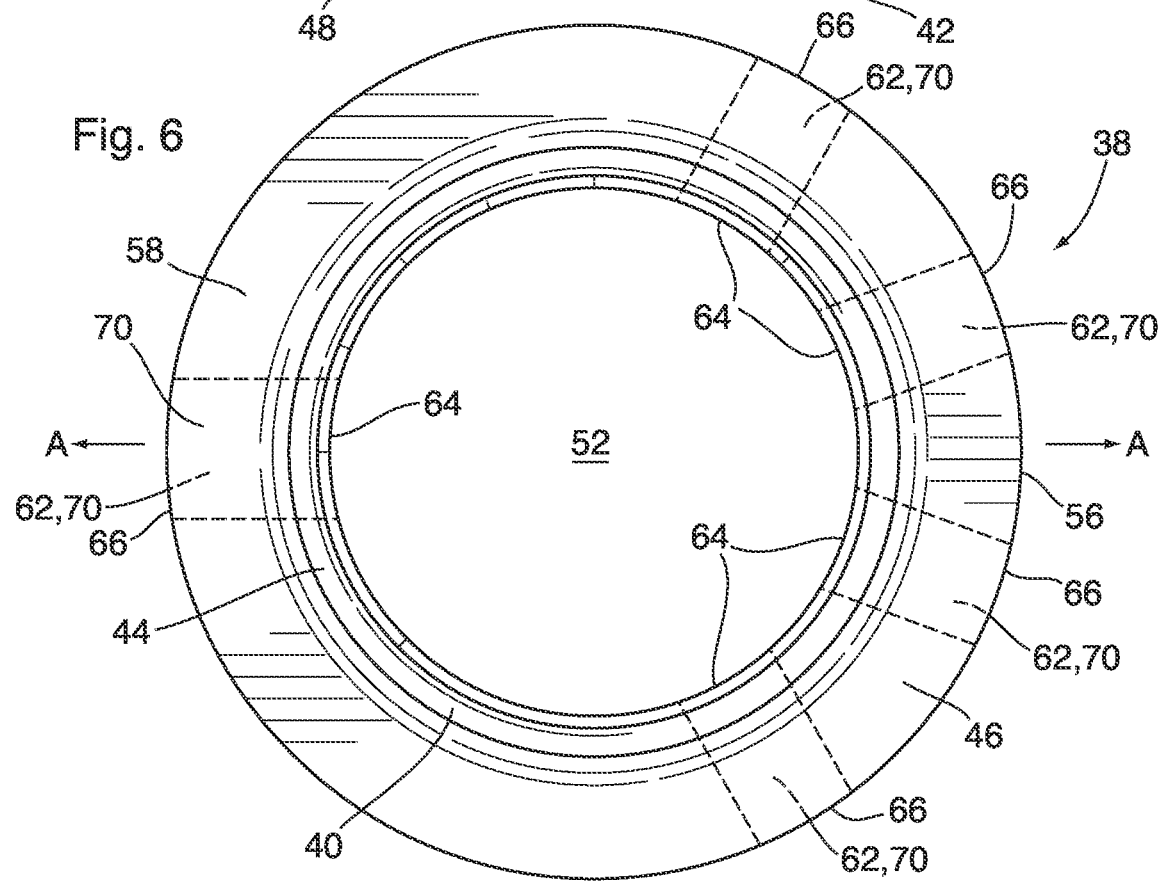
FIG. 6 is a top plan view of the two-piece through fitting of FIG. 4

In the present embodiment, the second surface 60 has a plurality of straight, radial channels 62, each having a substantially constant rectangular cross-section. The channels 62 are irregularly spaced along the second surface 60, with four channels 62 of substantially identical configuration which are substantially equally spaced from one another, and one wider channel 62 being spaced apart from the other four channels 62 by greater spacing. For example, as shown in the plan view of FIG. 6, the group of four narrower channels 62 are centered along an axis A which passes centrally through the wider channel 62. Therefore, the group of four narrower channels 62 faces away from the wider channel 62.

Although a specific number and configuration of channels 62 is shown in the present embodiment, it will be appreciated that the number and configuration of channels 62 is highly variable and dependent on the specific application. Also, at least where the channels 62 are machined into the second surface 60 of each flange portion 46, it is possible to customize the pattern of channels 62 according to the requirements of any specific application, without requiring changes to the basic configuration of each segment 40, 42.

The flange portion 46 of at least one of the segments 40, 42 is provided with one or more channels 62. In the present embodiment, both segments 40, 42 are provided with channels 62. Where the flange portions 46 of both segments 40, 42 are provided with channels 62, the channels 62 of opposed flange portions 46 may be the same or different, and may be aligned or non-aligned. For example, in the present embodiment, the two segments 40, 42 are identical, and include the same number and arrangement of channels 62. Furthermore, the heat exchanger 10 is assembled so that the channels 62 of opposed flange portions 46 are aligned with one another, and the second surfaces 60 are arranged in opposed, facing relation to one another and are mirror images of one another. Therefore, as shown in the drawings, the corresponding channels 62 of opposed flange portions 46 are combined together in the thickness dimension of the opposed flange portions 46. These combined flow channels are labelled with reference numeral 70 in the drawings, and have about twice the height of individual flow channels 62.

As shown in FIG. 3, the holes 34, 36 are located close to an outer edge of the fluid flow passage 28, as are the fittings 38. Therefore, the fluid flow passage 28 includes a narrow edge channel 72 between each of the fittings 38 and an outer edge of the fluid flow passage 28, adjacent to the peripheral flanges 24, 26. In the present embodiment, each narrow edge channel 72 extends around more than about one half of the circumference of the flange portion 46 of a fitting 38, and is open at its ends to the remainder of the fluid flow passage 28.

Each fitting 38 is arranged so that the second end 66 of at least one of the channels 62 faces toward the outer edge of the fluid flow passage 28 and is in flow communication with one of the narrow edge channels 72, to promote fluid circulation through the narrow edge channel 72 and prevent fluid stagnation in this area. In the illustrated embodiment, the two segments 40, 42 of each fitting 38 are arranged so that a major portion of the fluid flow through channels 62 is directed toward or received from the heat transfer area of heat exchanger 10 (i.e. the central area of heat exchanger 10), while a minor portion of the fluid flow through channels 62 is directed toward or received from the narrow edge channel 72. In the present embodiment, the single wider channel 62 faces toward the narrow edge channel 72 and the peripheral flanges 24, 26, while the remaining channels 62 generally face toward the heat transfer area of the fluid flow passage 28 and away from the peripheral flanges 24, 26 and narrow edge channel 72. However, this is not essential, and the location of the channels 62 relative to narrow edge channel 72 may be different from that shown in the drawings.

As shown in the drawings, each hole 34, 36 may be surrounded by a raised, circular embossment 74 which is sized to closely receive the flange portion 46 of the fitting 38, without obstructing the open second ends 66 of channels 62.

In the assembled heat exchanger 10, the two segments 40, 42 of each fitting 38 are arranged with the second surfaces 60 of opposed flange portions 46 facing one another, with the first surface 58 of flange portion 46 of first segment 40 in sealed contact with the inner surface 14 of first plate 12, and with the first surface 58 of flange portion 46 of second segment 42 in sealed contact with the inner surface 20 of second plate 18. Together, the flange portions 46 of the two segments 40, 42 extend throughout substantially the entire height of the fluid flow passage 28, with or without optional spacing 76, and therefore the fittings 38 provide internal support for the fluid flow passage 28 in the area around holes 34, 36, while providing fluid communication between the hollow interior 52 of each fitting 38 and the surrounding fluid flow passage 28.

The support provided by the flange portions 46 of segments 40, 42 avoids the need to provide additional support structures between the plates 12, 18 in the vicinity of inlet and outlet ports 30, 32. This allows a reduction in the number of components comprising heat exchanger 10 and/or simplifies the structure of the plates 12, 18.

As mentioned above, second surfaces 60 of the opposed flange portions 46 of segments 40, 42 may be in contact with one another or separated by spacing 76, but are not necessarily bonded together with a fluid-tight seal. However, in some embodiments, the opposed flange portions 46 may be metallurgically bonded together, for example by brazing. Where a brazed connection is provided, an annular brazing shim may be provided between the second surfaces 60 opposed flange portions 46 during assembly of heat exchanger 10.

Figure 7:
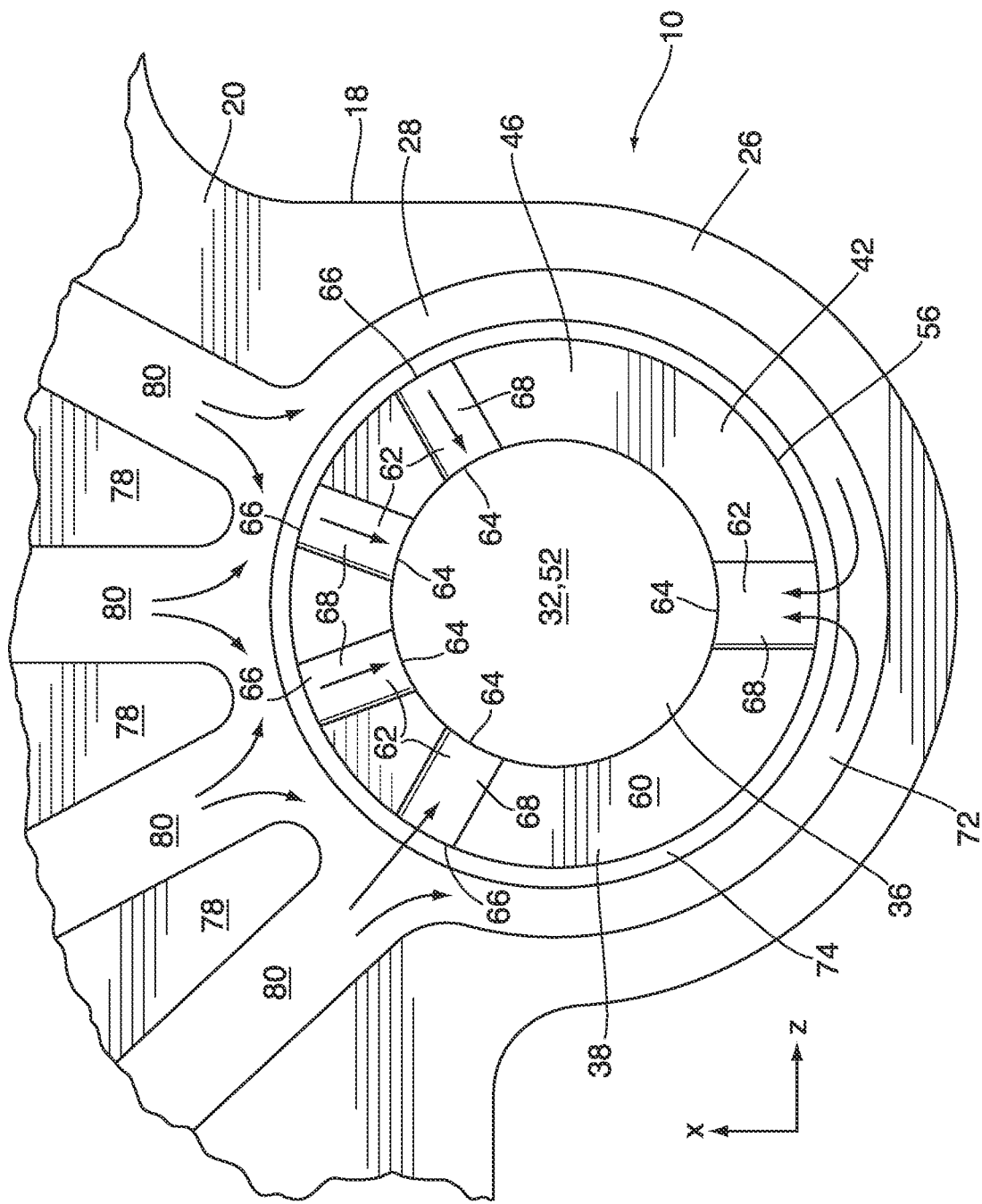
FIG. 7 is a close-up of a portion of a heat exchanger according to an embodiment.

FIG. 7 shows a portion of a heat exchanger 10, specifically a top plan view of the second segment 42 of fitting 38 received in second hole 36 of second plate 18, in the area immediately surrounding outlet port 32. The heat exchanger 10 includes a fluid flow passage 28, with plate 18 including a plurality of embossed ribs 78 to guide fluid flow throughout the heat transfer area of heat exchanger 10, to maximize heat transfer and/or temperature uniformity. The embossed ribs 78 separate the fluid flow passage 28 into separate flow channels 80 which are in communication with at least some of the channels 62 of fitting 38. In the specific example shown, a plurality of the channels 62 of fitting 38 face toward the open ends of flow channels 80, and may or may not line up directly with channels 80, to receive fluid directly or indirectly from channels 80, as shown by the arrows in FIG. 7. A portion of the fluid discharged from channels 80 will flow into the narrow edge channel 72 which partially surrounds the outer peripheral edge 56 of flange portion 46. This fluid will enter the outlet port 32 through the single channel 62 facing away from channels 80.

FIG. 7 also shows that the channels 62 of fitting 38 do not necessarily have the same width. The widths of the channels 62 may be varied to better control fluid flow, to maximize heat transfer and/or temperature uniformity.

As described above, it may be desirable for the segments 40, 42 of through fitting 38 to have a specific orientation inside the fluid flow passage 28, and it may be desirable for the segments 40, 42 to have a specific orientation to one another. Therefore, during assembly of heat exchanger 10, it may be desirable to ensure proper orientation of segments 40, 42 within the respective first and second holes 34, 36 of plates 12, 18. This may be at least partially accomplished by ensuring a tight fit between the collars 54 surrounding holes 34, 36 and the tube portions 44 of the segments 40, 42 of through fittings 38. The fit between collar 54 and tube portion 44 is sufficiently tight to prevent rotation of the segments 40, 42 during assembly.

Figure 8:
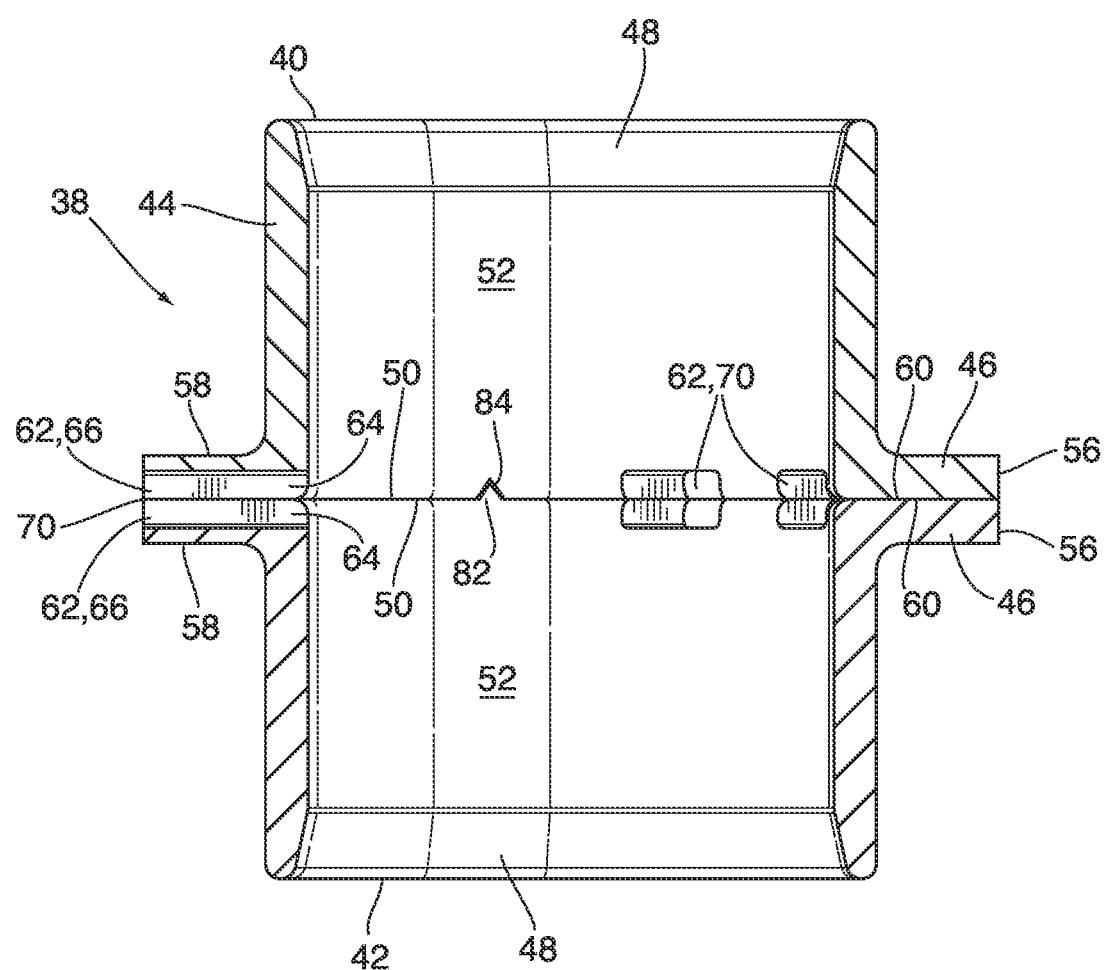
FIG. 8 shows a through fitting according to another embodiment.

In some embodiments it may be desirable to provide the segments 40, 42 with alignment features, to ensure that they will be combined in a specific orientation. For example, as shown in FIG. 8, the second surfaces 60 of flange portions 46 may be provided with interlocking alignment features to assist in orienting segments 40, 42 with their channels 62 aligned. Such alignment features are shown as comprising a rib 82 projecting from the second surface 60 of second segment 42, which is received in a groove 84 recessed in the second surface 60 of first segment 40. Where alignment features are incorporated into segments 40, 42, they may have any desired configuration.

FIG. 9 shows a portion of a heat exchanger 10 in which all the channels 62 are provided in the first segment 40 of through fitting 38, and the second segment is free of channels.

FIG. 10 shows a portion of a heat exchanger 10, and illustrates a number of additional features, most of which have been mentioned above. In FIG. 10 the first and second segments 40, 42 of through fitting 38 each comprise a plurality of channels 62 in their second surfaces 60, the channels 62 being identified by reference characters A to G. As shown in FIG. 10, the channels 62 may have different cross-sectional shapes and sizes. In this regard, channels 62C and 62D have greater cross-sectional area than the other channels 62; channel 62A has a rounded top while the other channels 62 are rectangular; channels 62A and 62B are partly aligned with each other; channels 62C and 62D are identical and are completely aligned; channel 62F has a smaller cross-sectional area than the other channels 62; and channels 62E, 62F and 62G are non-aligned. It will be appreciated that any one or more of these features may be incorporated into a through fitting 38.

While various embodiments have been described in connection with the present disclosure, it will be understood that certain adaptations and modifications of the described exemplary embodiments can be made as construed within the scope of the present disclosure. Therefore, the above discussed embodiments are considered to be illustrative and not restrictive.

What is claimed is:

1. A heat exchanger comprising:
   (a) a first plate having an inner surface, an outer surface and at least one first hole;
   (b) a second plate having an inner surface, an outer surface and at least one second hole, wherein each of the at least one first holes is in opposed, spaced relation to one of said at least one second holes;
   (c) a fluid flow passage defined between the inner surfaces of the first and second plates;
   (d) at least one through fitting, wherein each said through fitting comprises a first segment and a second segment, each said segment having a first open end located outside the fluid flow passage, a second open end inside the fluid flow passage, and a hollow interior;
   wherein each said segment comprises a tube portion and a flange portion;
   wherein the flange portion is located inside the fluid flow passage;
   wherein the tube portion of each said segment extends through one of the first or second holes to the first open end of said segment;
   wherein the flange portion of each said segment extends radially outwardly of the tube portion and is joined thereto, the flange portion having opposite first and second surfaces, wherein the first surface is continuous and is sealingly joined to the inner surface of one of the first and second plates so as to provide a continuous seal between the segment and the first or second plate in an area surrounding the first or second hole;

wherein the second surface of the flange portion of the first segment is in opposed facing relation to the second surface of the flange portion of the second segment;

wherein the second surface of one or both of the first and second segments comprises one or more channels, each said channel having an open first end and an opposite open second end, wherein the open first end is in flow communication with the hollow interior of the through fitting, and the open second end is in fluid communication with the fluid flow passage.

2. The heat exchanger according to claim 1, wherein the fluid flow passage extends between an inlet port and an outlet port; and wherein each of the inlet port and the outlet port is in the form of a through opening comprising an opposed pair of said at least one first and second holes.

3. The heat exchanger according to claim 1, wherein the first and second segments of each said through fitting are in concentric arrangement with one another.

4. The heat exchanger according to claim 1, wherein the flange portion of each said segment is annular and has a thickness of about one half of a height of the fluid flow passage in an area surrounding the first and second holes.

5. The heat exchanger according to claim 1, wherein the flange portion has an outer peripheral edge which is spaced from an edge of the fluid flow passage.

6. The heat exchanger according to claim 1, each of the one or more channels extends part way through a thickness of the flange portion, and has an open face which is co-planar with the second surface.

7. The heat exchanger according to claim 1, wherein said one or more channels comprises a plurality of channels, which are spaced apart from one another along the second surface.

8. The heat exchanger according to claim 1, wherein the second surface of each of the first and second segments is provided with said one or more channels.

9. The heat exchanger according to claim 8, wherein each of the channels in the second surface of the first segment is aligned with one of the channels in the second surface of the second segment, so as to provide one or more combined flow channels.

10. The heat exchanger according to claim 9, wherein the second surfaces of the two segments are mirror images, such that each of the channels in the second surface of the first segment is aligned with a corresponding one of the channels in the second surface of the second segment.

11. The heat exchanger according to claim 1, wherein the holes are proximate to an outer edge of the fluid flow passage, such that the fluid flow passage includes a narrow edge channel between each of the through fittings, wherein the narrow edge channel is open at its ends;

wherein the open second end of at least one of the channels faces toward the outer edge of the fluid flow passage and is in flow communication with the narrow edge channel.

12. The heat exchanger of claim 1, wherein the flange portions of the first and second segments have a combined height such that they extend throughout substantially an entire height of the fluid flow passage, to provide internal support for the fluid flow passage in areas surrounding the first and second holes, while providing flow communication between the hollow interior of each fitting and the fluid flow passage.

13. The heat exchanger of claim 12, wherein the flange portions of the first and second segments have a combined height which is slightly less than a height of the fluid flow passage;

wherein a narrow spacing is provided between the second surfaces of the flange portions of the first and second segments.

14. The heat exchanger of claim 12, wherein a major amount of fluid flow between the hollow interior of each through fitting and the fluid flow passage is through the channels, and a minor amount of said fluid flow is through the spacing between the second surfaces of the flange portions.

15. The heat exchanger of claim 12, wherein the spacing between the second surfaces of the flange portions is less than about 5% of a height of the fluid flow passage.

16. The heat exchanger according to claim 1, wherein the first and second plates are comprised of an aluminum alloy, wherein the inner surfaces of the plates are provided with a clad layer of a brazing alloy, wherein the first surfaces of the flange portions are sealingly joined to the inner surfaces of the first and second plates, with the clad layer forming a braze joint between the first surfaces of the flanges and the inner surfaces of the first and second plates.

17. The heat exchanger according to claim 1, wherein each of the holes is surrounded by an upstanding collar which engages the outer surface of one of the tube portions.

18. The heat exchanger according to claim 1, wherein the flange portion of each said segment has an annular disc-like shape with an outer peripheral edge which is circular and concentric with the tube portion.

19. The heat exchanger according to claim 1, wherein each of the channels is straight and radially directed between its first and second open ends.

20. A thermal management system comprising a plurality of heat exchangers according to claim 1, wherein the heat exchangers are fluidly connected in parallel flow arrangement, and wherein the heat exchangers are spaced apart from one another to receive a component to be cooled and/or heated between outer surfaces of adjacent pairs of said heat exchangers.

* * * * *